(12) United States Patent
Horsman et al.

(10) Patent No.: US 9,110,554 B2
(45) Date of Patent: *Aug. 18, 2015

(54) REPRESENTING A GRAPHICAL USER INTERFACE USING A TOPIC TREE STRUCTURE

(71) Applicant: International Business Machines Corporation, Armonk, NY (US)

(72) Inventors: Steven J. Horsman, Farnborough (GB); Matthew J. Kockott, Winchester (GB); Jonathan C. Mace, Winchester (GB); Andrew Moger, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/917,853

(22) Filed: Jun. 14, 2013

(65) Prior Publication Data

US 2014/0013236 A1 Jan. 9, 2014

Related U.S. Application Data

(63) Continuation of application No. 13/540,774, filed on Jul. 3, 2012.

(51) Int. Cl.
*H04N 1/00* (2006.01)
*G06F 3/048* (2013.01)
*G06F 9/44* (2006.01)

(52) U.S. Cl.
CPC .............. *G06F 3/048* (2013.01); *G06F 9/4443* (2013.01)

(58) Field of Classification Search
CPC ................ H04N 1/00453; H04N 1/00456
USPC ........................................................ 715/744
See application file for complete search history.

(56) References Cited

U.S. PATENT DOCUMENTS 5,701,137 A 12/1997 Kiernan et al.
6,348,935 B1 2/2002 Malacinski et al.
(Continued)

FOREIGN PATENT DOCUMENTS

EP 0 645 695 A1 3/1995

OTHER PUBLICATIONS

Hatzigaidas et al. "A Topic Map Editor and Navigation Tool," Dept. of Electronics, Technological Educational Institution of Thessaloniki, IADIS International Conference www/Internet 2004, pp. 359-365.

(Continued)

*Primary Examiner* — Andrea Long
(74) *Attorney, Agent, or Firm* — Holland & Knight LLP; Brian J. Colandreo, Esq.; Jeffrey T. Placker, Esq.

(57) ABSTRACT

A method, computer program product, and system for a quality-of-service history database is described. A first input associated with a change to a component of a graphical user interface is received, wherein a portion of the component is represented as a first node of a tree structure representing a portion of the graphical user interface. A first characteristic of the change is determined. The first characteristic of the change is associated with a second node of the topic tree structure. The associated first characteristic is transmitted to a first computing device, wherein transmission of the associated first characteristic allows one or more of the first computing device and a second computing device to determine a first aspect of the change based upon, at least in part, the topic tree structure.

8 Claims, 7 Drawing Sheets

(56) References Cited

U.S. PATENT DOCUMENTS

| | | | |
|---|---|---|---|
| 6,826,443 B2* | 11/2004 | Makinen | 700/121 |
| 7,213,046 B2* | 5/2007 | Barillaud | 709/202 |
| 7,290,216 B1* | 10/2007 | Kawahara et al. | 715/762 |
| 7,519,923 B2 | 4/2009 | Peterson et al. | |
| 7,743,135 B2 | 6/2010 | Azuma | |
| 8,127,252 B2* | 2/2012 | McKeon et al. | 715/854 |
| 8,453,052 B1* | 5/2013 | Newman et al. | 715/255 |
| 2001/0004746 A1* | 6/2001 | Wright | 709/314 |
| 2002/0049786 A1* | 4/2002 | Bibliowicz et al. | 707/511 |
| 2005/0066293 A1 | 3/2005 | Hunt | |
| 2005/0086608 A1* | 4/2005 | Roessler | 715/764 |
| 2008/0059583 A1* | 3/2008 | Mao et al. | 709/205 |
| 2010/0054618 A1 | 3/2010 | Kawazoe et al. | |
| 2011/0134120 A1* | 6/2011 | Antonyuk et al. | 345/426 |
| 2011/0208807 A1* | 8/2011 | Shaffer | 709/203 |
| 2012/0072537 A1* | 3/2012 | Hagan | 709/217 |
| 2012/0130947 A1* | 5/2012 | Gaikwad | 707/625 |
| 2012/0173621 A1* | 7/2012 | Crosbie et al. | 709/204 |
| 2012/0246237 A1* | 9/2012 | Crosbie et al. | 709/205 |

OTHER PUBLICATIONS

Lukas Giebmann et al., Isidor-UI: Generating a User Interface with topic Maps Constraint Language and JavaScript Object Notation, Worms University of Applied Sciences, Fifth International Conference on Topic Maps Research and Applications, Nov. 12-13, 2009, pp. 207-218.

Sanchez, http://conceptmodeler.wordpress.com/category/visualization/, Jan. 12, 2012, pp. 1-19.

* cited by examiner

REPRESENTING A GRAPHICAL USER INTERFACE USING A TOPIC TREE STRUCTURE

RELATED APPLICATION

The subject application is a continuation application of U.S. patent application with Ser. No. 13/540,774, filed Jul. 3, 2012, the entire content of which is herein incorporated by reference.

TECHNICAL FIELD

This disclosure relates to graphical user interfaces.

BACKGROUND

A graphical user interface is the visual representation of various aspects of a computer program or programs that permit one or more users to view and interact with the program. It may be useful to actively share all or a portion of a graphical user interface among various users, including when those users are located remotely from each other.

BRIEF SUMMARY OF THE DISCLOSURE

According to a first aspect of the disclosure, a computer-implemented method includes receiving, by a first computing device, a first input associated with a change to a component of a graphical user interface, wherein a portion of the component is represented as a first node of a topic tree structure representing a portion of the graphical user interface. The method further includes determining, by the first computing device, a first characteristic of the change. The method further includes associating, by the first computing device, the first characteristic of the change with a second node of the topic tree structure. The method further includes transmitting to a second computing device, by the first computing device, the associated first characteristic, wherein transmission of the associated first characteristic allows one or more of the second computing device and a third computing device to represent the first characteristic of the change based upon, at least in part, the topic tree structure.

One or more of the following features may be included. The method may include determining, by the first computing device, a second characteristic of the change. The method may include associating, by the first computing device, the second characteristic of the change with a third node of the topic tree structure, wherein the third node may be a sub-node of one or more of the first and second nodes. The method may include transmitting to the second computing device, by the first computing device, the associated second characteristic, wherein transmission of the associated second characteristic may allow one or more of the second computing device and the third computing device to represent the second characteristic of the change based upon, at least in part, the topic tree structure.

Transmitting the associated first characteristic may include transmitting the associated first characteristic as a topic string associated with a message broker, wherein the message broker may be configured to receive published information and transmit a portion of the published information to a subscriber, and the topic string may be associated with the second node of the topic tree structure. The first characteristic may be associated with a text content of the component. A timestamp may be associated with the first characteristic. The first characteristic may be independent of a user preference.

The method may further include storing, by the first computing device, a set of characteristics including the first characteristic. The method may further include transmitting, in a pre-determined order, by the first computing device, one or more characteristics included in the set of characteristics. The set of characteristics may include a pre-determined number of characteristics.

According to another aspect of the disclosure, a computer program product resides on a computer readable storage medium and has a plurality of instructions stored on it. When executed by a processor, the instructions cause the processor to perform operations including receiving a first input associated with a change to a component of a graphical user interface, wherein a portion of the component is represented as a first node of a topic tree structure representing a portion of the graphical user interface. The operations further include determining a first characteristic of the change. The operations further include associating the first characteristic of the change with a second node of the topic tree structure. The operations further include transmitting to a first computing device the associated first characteristic, wherein transmission of the associated first characteristic allows one or more of the first computing device and a second computing device to represent the first characteristic of the change based upon, at least in part, the topic tree structure.

One or more of the following features may be included. The plurality of instructions, when executed by the processor, may cause the processor to perform operations including determining a second characteristic of the change. The operations may also include associating the second characteristic of the change with a third node of the topic tree structure, wherein the third node may be a sub-node of one or more of the first and second nodes. The operations may further include transmitting to the first computing device the associated second characteristic, wherein transmission of the associated second characteristic may allow one or more of the first computing device and the second computing device to represent the second characteristic of the change based upon, at least in part, the topic tree structure.

Transmitting the associated first characteristic may include transmitting the associated first characteristic as a topic string associated with a message broker, wherein the message broker may be configured to receive published information and transmit a portion of the published information to a subscriber, and the topic string may be associated with the second node of the topic tree structure. The first characteristic may be associated with a text content of the component. The first characteristic may be independent of a user preference.

The plurality of instructions, when executed by the processor, may further cause the processor to perform operations including storing a set of characteristics including the first characteristic. The operations may further include transmitting, in a pre-determined order, one or more characteristics included in the set of characteristics.

According to another aspect of the disclosure, a computing system includes at least one processor and at least one memory architecture coupled with the at least one processor. The computing system also includes a first software module executable by the at least one processor and the at least one memory architecture, wherein the first software module is configured to receive a first input associated with a change to a component of a graphical user interface, wherein the component is represented as a first node of a topic tree structure representing a portion of the graphical user interface. The computing system also includes a second software module executable by the at least one processor and the at least one memory architecture, wherein the second software module is configured to determine a first characteristic of the change. The computing system also includes a third software module executable by the at least one processor and the at least one memory architecture, wherein the third software module is configured to associate the first characteristic of the change with a second node of the topic tree structure The computing system also includes a fourth software module executable by the at least one processor and the at least one memory architecture, wherein the fourth software module is configured to transmit to a first computing device the associated first characteristic, wherein transmission of the associated first characteristic allows one or more of the first computing device and a second computing device to represent the first characteristic of the change based upon, at least in part, the topic tree structure.

One or more of the following features may be included. The computing system may include a sixth software module executable by the at least one processor and the at least one memory architecture, wherein the sixth software module is configured to determine a second characteristic of with the change. The computing system may include a seventh software module executable by the at least one processor and the at least one memory architecture, wherein the seventh software module is configured to associate the second characteristic of the change with a third node of the topic tree structure, wherein the third node may be a sub-node of one or more of the first and second nodes. The computing system may include an eighth software module executable by the at least one processor and the at least one memory architecture, wherein the eighth software module is configured to transmit to the first computing device the associated second characteristic, wherein transmission of the associated second characteristic may allow one or more of the first computing device and the second computing device to represent the second characteristic of the change based upon, at least in part, the topic tree structure.

Transmitting the associated first characteristic may include transmitting the associated first characteristic as a topic string associated with a message broker, wherein the message broker may be configured to receive published information and transmit a portion of the published information to a subscriber, and the topic string is associated with the second node of the topic tree structure. The first characteristic may be associated with a text content of the component. The first characteristic may be independent of a user preference.

The computing system may also include a ninth software module executable by the at least one processor and the at least one memory architecture, wherein the ninth software module is configured to store a set of characteristics including the first characteristic. The computing system may also include a tenth software module executable by the at least one processor and the at least one memory architecture, wherein the tenth software module is configured to transmit, in a pre-determined order, one or more characteristics included in the set of characteristics.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

Figure 1:
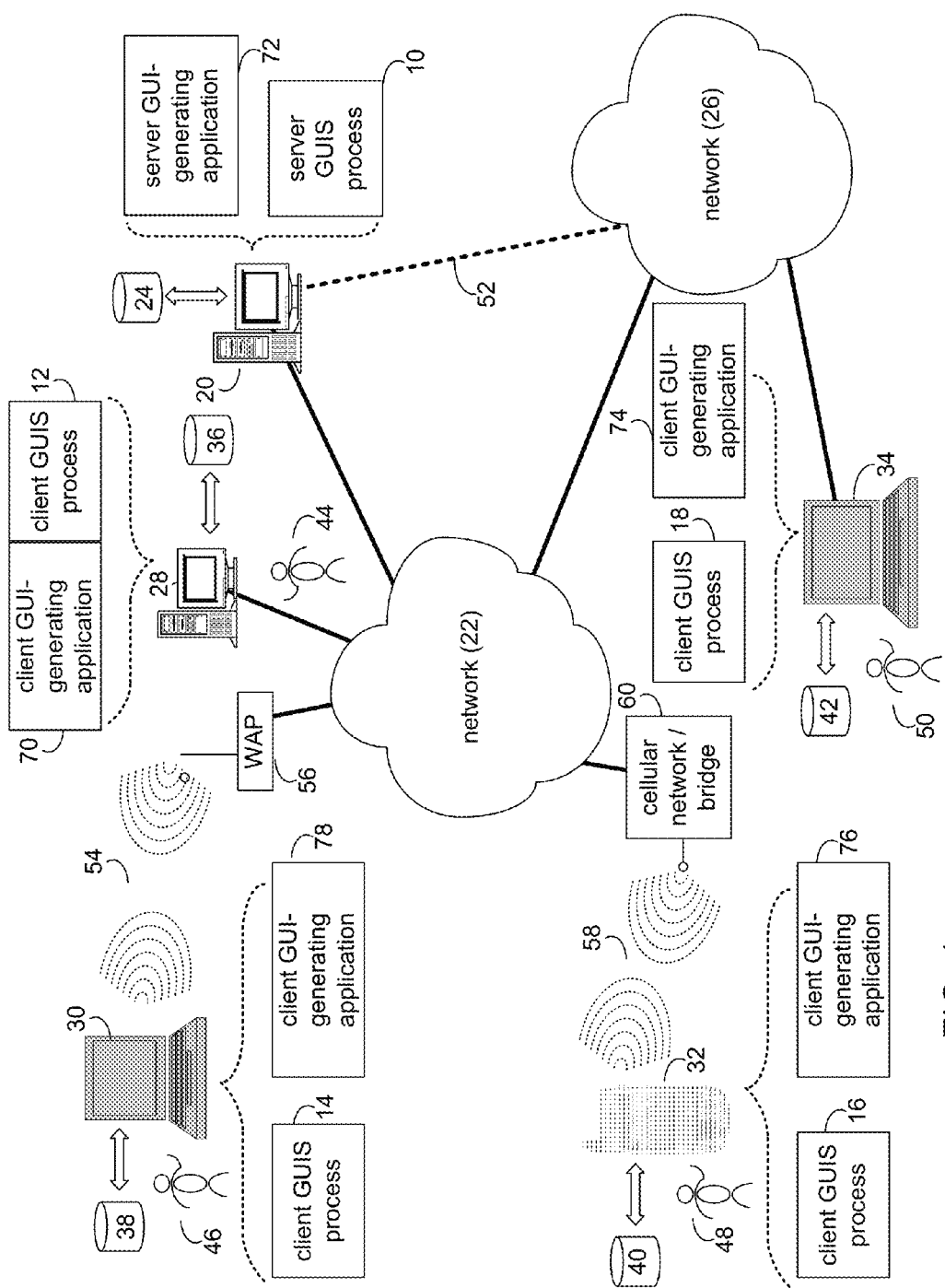
FIG. 1 is a diagrammatic view of a graphical-user-interface sharing process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like.

However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

A graphical user interface ("GUI") permits users to interact with various computer programs and functionality, often without requiring the users to be familiar with complicated protocols or specific computer programming language. A GUI may permit a user to modify aspects of the GUI. For example, a user may utilize various inputs (e.g., a mouse click or double-click, a mouse click-and-drag, a keyboard input, a touchscreen input, a gesture sensed by motion-detecting apparatus or software, etc.) in order to affect the location, orientation or size of one or more components of a GUI (e.g., by moving, rotating, zooming in, zooming out, enlarging, shrinking, cropping, etc.). A GUI also may permit a user to input, remove or otherwise modify content stored or represented by a program. For example, a user may employ a keyboard or other device to enter (or delete) text content, including standard text as well hyperlinks and text with associated metadata, into (or from) one or more components of a GUI. Similarly, a user may use a variety of means to add (or delete) multimedia content, including pictures, links to audio files, video files, and presentation slides, to (or from) one or more components of a GUI. A user may also modify content of a GUI without adding new content or deleting old content.

A user may also open, close or otherwise modify various windows or other components of a GUI, thereby causing a change in the GUI. It will be understood that a modification to a component of a GUI need not require affirmative action on the part of a user. For example, a GUI may be modified by the lack of action in certain circumstances (e.g., a dialog window noting "This window will close in ten seconds unless you click 'Cancel'").

In order to facilitate collaborative work, it may be useful to share all or a portion of a GUI with one or more other users. One common scenario where this may occur is in computer diagnostics or trouble-shooting. For example, a user may experience difficulty with the operation of a certain aspect of an application. Lacking the expertise to remedy the problem himself, the user may seek assistance from an expert. Often, however, the expert is located remotely from the user and cannot physically view the user's computer screen. Accordingly, the user may "share" the view of his screen (or a portion) with the expert, allowing the expert to see an image of the user's screen on his own computer monitor. In order to facilitate assistance from the expert, it may be useful to continuously (or regularly) update the view of the user's screen (or the relevant GUI) on the expert's monitor. In this way the expert may, for example, control the user's mouse in order to navigate the malfunctioning application or may instruct the user on remedial measures and immediately view whether those measures have been implemented properly and have alleviated the user's problem. (It will be understood, in this example scenario as well as throughout this disclosure, that references to "sharing" a GUI may refer to the shared use of a single GUI by multiple systems or user or may refer to the use of separate GUIs by multiple systems or users, wherein the separate GUIs have one or more similar or otherwise corresponding portions.)

Sharing of GUI views may be useful in other scenarios as well. For example, sharing a GUI may be useful in the context of an eLearning or eMeeting environment. In eLearning, one or more users may employ one or more computers to participate in a seminar, lecture or other presentation, which may be conducted by one or more experts on a particular topic. An eLearning session may include sharing of presentation materials, including text and multimedia content. Thus, in an eLearning context, it may be useful to share views of one or more GUIs. For example, a presenter discussing the features of an operating system such as Microsoft Windows® may desire to share views of the actions she is taking so that the other users can follow the steps that are necessary to unlock certain functionality. (Microsoft and Windows are registered trademarks of Microsoft Corporation in the United States, other countries or both.) Alternatively, various participants in an eLearning session may wish to collaborate on an assignment using a single program with a common GUI. Again, it may be useful to share the GUI in this instance in order to facilitate the collaboration.

Similarly, in an eMeeting multiple participants may interact via electronic means in order to exchange audio, audiovisual, text and other content, often to advance a particular business project. As with eLearning sessions, in an eMeeting it may be useful to share a GUI among participants in order for the participants to easily follow a demonstration or collaborate on achieving a particular goal. For example, in a brainstorming session, a shared GUI may allow multiple participants to input content into a single shared view or edit existing content in the view. Sharing a GUI that includes the view may allow each participant to simultaneously view the inputs and edits of all participants in order to collaboratively develop project concepts.

As is apparent from the examples above, when a GUI is shared among users, it may be desirable to display to one user the changes made to the GUI by another user. One method of sharing the GUI among users may include transmitting the entire GUI, as it appears to one user (e.g., as it is displayed via a computing device associated with a first user), to one or more remote users (i.e., to one or more computing devices associated with the one or more remote users). This may be thought of, in certain circumstances, as sharing an image or "screen-shot" of the entire GUI, and may require transmission of large amounts of data, especially when a GUI include many components or the GUI is shared among many users. Another method, which may be performed by one or more embodiments of a GUI Sharing (GUIS) process, may, in response to a change in a GUI, transmit only a portion of the GUI that is related to a change in the GUI. It will be understood that normally a GUI may be reasonably static. Even when users are adding or otherwise editing content in the GUI, only a small portion of the GUI may actually changes for any given user action. For example, in an email (or other) application, the menu bars, toolbars and various content panels may display unchanged content throughout a substantial portion of a sharing session. By exploiting this aspect of a GUI, a GUIS process may permit sharing of a GUI without requiring transmission of a data set representing the entire GUI. Rather, using a GUIS process, a more limited data set representing only a relevant portion or portions of the GUI (or the relevant characteristic or characteristics of any change to the GUI) may be transmitted between collaborating users.

Referring now to FIG. 1, a GUIS process may be coupled to a computer or computer network. For example, server GUIS process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server GUIS process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server™, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; and Apache is a registered trademarks of Apache Software Foundation in the United States, other countries, or both.) Network 22 may be connected to one or more secondary networks (e.g., network 26), examples of which may include but are not limited to: a local area network; a wide area network; or an intranet, for example.

Client GUIS processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CEO, Red Hat® Linux®, or a custom operating system.

The instruction sets and subroutines of client GUIS processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In order to provide a GUI, a GUI-generating application may operate on a client device (e.g., client GUI-generating application 78, operating on client electronic device 30; client GUI-generating application 70, operating on client electronic device 28; client GUI-generating application 74, operating on client electronic device 34; or client GUI-generating application 76, operating on client electronic device 32). A client GUIS process (e.g., client GUIS process 14) or a server GUIS process (e.g., server GUIS process 10) may be in communication with a client GUI-generating application (e.g., client GUI-generating application 78) or may be part of the client GUI-generating.

A GUI-generating application may additionally or alternatively operate on a server device (e.g., server GUI-generating application 72, operating on server computer 20). A server GUIS process (e.g., server GUIS process 10) or a client GUIS process (e.g., client GUIS process 14) may be in communication with a server GUI-generating application (e.g., server GUI-generating application 72) or may be a part of the server GUI-generating application.

A GUI-generating application may be any program or application that generates a GUI. For example, Lotus Notes® is an application that facilitates email communication between users. (Lotus and Lotus Notes are trademarks of International Business Machines Corporation in the United States, other countries or both.) In order to permit users to operate its functionality, Lotus Notes generates a GUI that may include various features such as a navigation buttons, menu bars, viewing windows, and input windows. It will be understood that Lotus Notes is only one example of many programs and program types that generate a GUI in order to permit operation of their functionality.

Users 44, 46, 48, 50 (also variously referred to as "participants" or "moderators") may access a GUIS process in various ways. For example, these users may access server GUIS process 10 directly through the device on which a client process (e.g., client GUIS processes 12, 14, 16, 18) is executed, namely client electronic devices 28, 30, 32, 34.

Users 44, 46, 48, 50 may access server GUIS process 10 directly through network 22 and/or through secondary network 26. Further, server computer 20 (i.e., the computer that executes server GUIS process 10) may be connected to network 22 through secondary network 26, as illustrated with phantom link line 52. Users 44, 46, 48, 50 may also access a GUI-generating application in similar ways.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client GUIS process 12 will be described for illustrative purposes. It will be understood that client GUIS process 12 may, for example, be interact and/or communicate with server GUIS process 10 and/or may be executed within one or more applications that allow for communication with other server and/or client GUIS processes. This is not intended to be a limitation of this disclosure, as other configurations are possible (e.g., GUIS process 12 may include stand-alone client processes and/or stand-alone server processes.) For example, some implementations may include one or more of client GUIS processes 14, 16, 18 or server GUIS process 10 in place of or in addition to client GUIS process 12.

Figure 2:
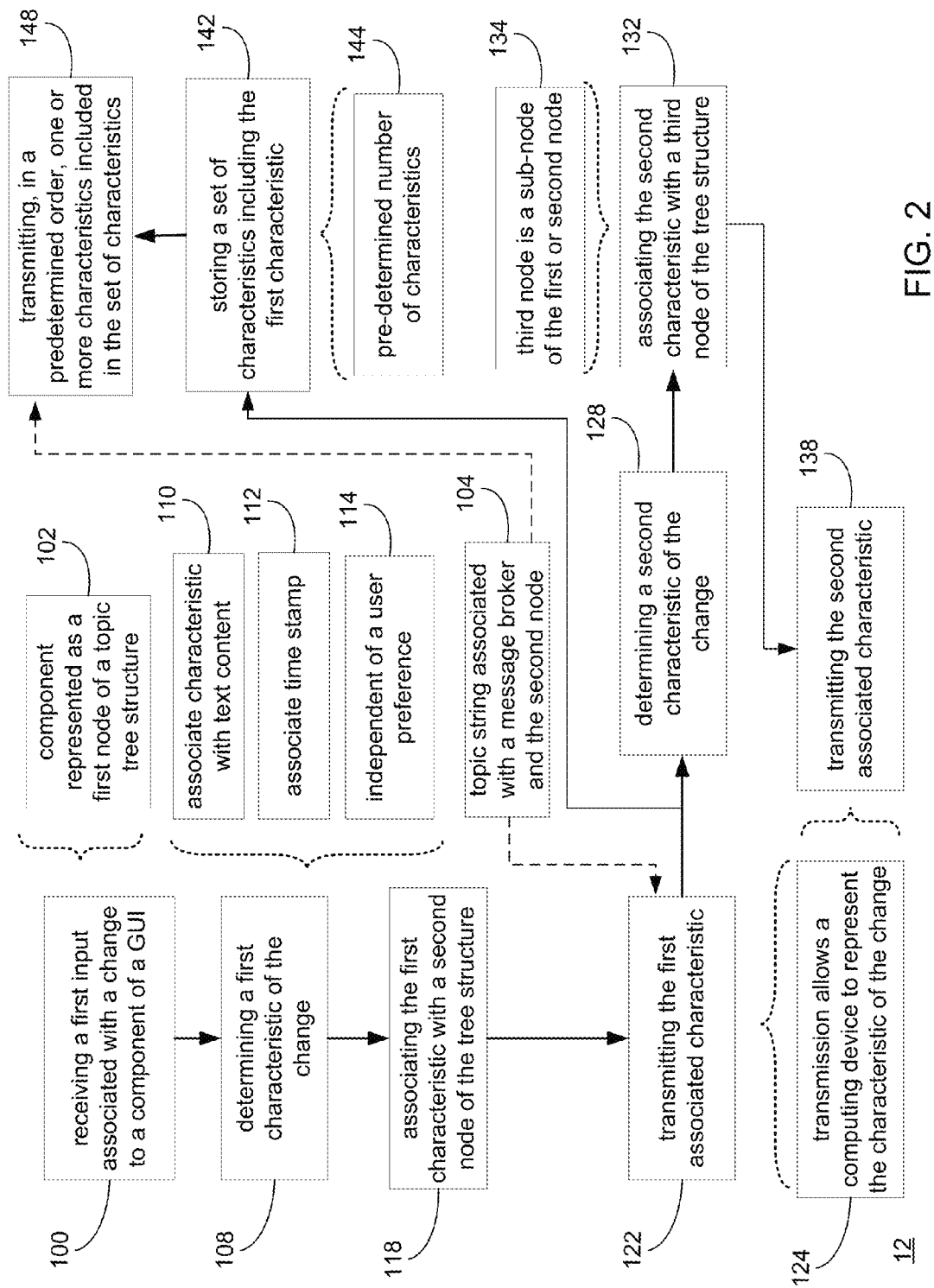
FIG. 2 is a flowchart of a process executed by the graphical-user-interface sharing process of FIG. 1.

Referring now also to FIG. 2, there is shown a diagrammatic view of a process implemented by a GUIS process, e.g., client GUIS process 12. Client GUIS process 12 may receive 100 a first input associated with a change to a component of a GUI. It will be understood that a GUI may be considered as composed of one or more components. For example, returning to the example of Lotus Notes®, a GUI may include a menu bar component, a viewing pane component, an inbox view component, etc. It will be understood that a given component may include various sub-components and may itself also be a subcomponent of a different component. Using various input means, a user may effect a change in a component. For example, a user may open the inbox view component or close the viewing pane component. A user may adjust the tools appearing on the toolbar component. A user may open a "compose message" component and may input various content into that (or another) component, including text content, multimedia content, and so on. In response to the user changing a component of a GUI, GUIS process 12 may received 100 an input that may be associated with the change to the component. The input may include, for example, an indication of the component that was changed, an indication of the change that was made to the component, or the like.

The component may be represented 102 as a first node of a topic tree structure representing a portion of the GUI. A topic tree may be a method of representing hierarchical data in which more general categories of data (or elements of a data set) may be represented as "parent" nodes, with more specific categories of data represented as "child" or "sub-nodes." Connections or "links" between parent and sub-nodes may indicate various relationships and dependencies between the data represented by the linked nodes, particularly a relationship between a general data category and more specific sub-categories. It will be understood that sub-nodes may in turn represent parent nodes to other sub-nodes further down the topic tree (i.e., sub-nodes indicating a more specific category of data). Typically parent nodes (which may also be sub-nodes of "higher" parent nodes) do not display links to unrelated sub-nodes. As an example, a topic tree representing mechanized modes of transportation might include a first parent (or "root") node representing "all moving vehicles." This root node may be linked to various sub-nodes including "boats," "cars," "trains," "planes," etc. Each sub-node may in turn be linked to additional sub-nodes. For example, "cars" may be linked to further sub-nodes "compact cars," "light trucks," "SUVs," etc. (It will be understood that additional levels of sub-nodes may be included that are linked to these categories, and so on.)

It will be understood that a GUI may be suitable for representation as a topic tree. For example, GUIs tend to be hierarchical by nature and thus may be easily separated into components and sub-components which may then be allocated into nodes and sub-nodes of a topic tree. As such, a GUI may, in some embodiments, be comfortably represented by a topic tree structure. Further, a GUI may include standard components across users. For example, in an email program, a GUI may typically include a menu bar and toolbar, a mailbox pane, a viewing pane, a calendar sidebar, etc. Accordingly a GUI topic tree associated with a particular program may have a similar structure across multiple instantiations of the program (e.g., which instantiations may be associated with different users). For example, the respective GUI topic trees for the interfaces associated with each of multiple instantiations of the program may be generally congruent GUI topic trees with corresponding nodes and sub-nodes.

A topic tree structure associated with GUIS process 12 may, for example, be generated independently by each user (e.g., according to a common and/or related algorithm or protocol, so as to facilitate sharing of information based on the tree structure) or may be generated at a single device and shared among users. For example, if multiple users will be sharing a GUI for Lotus Notes®, each user (using a computing device) may independently (or collaboratively) generate their own topic tree for Lotus Notes® or all users may share a single topic tree that is generated by a single computing device. Regardless of whether single topic tree or multiple topic trees are generated it may be desirable, in order to facilitate efficient operation of a GUIS process, for a portion of the nodes of each topic tree associated with a given GUI (e.g., a GUI generated by client GUI-generating application 70) to correspond to a portion of nodes of each other topic tree associated with that GUI (e.g., associated with GUI's generated by one or more of client GUI-generating applications 74, 76, 78). For example, for Lotus Notes® each user's topic tree may include a root node corresponding to the entire GUI as well as distinct sub-nodes for the inbox view component, the viewing pane component, etc. Sharing of a single topic tree among users may facilitate this congruence.

Client GUIS process 12 may determine 108 a first characteristic of the change to the component of the GUI. It will be understood that a characteristic of a change may include the entire change or only an aspect of the change. For example, a user may change the "compose message" component of an email program by entering formatted text, pasting a picture, resizing the "compose message" window and then moving the window to a different location in the larger GUI. In this case the characteristic may be associated 110 with the formatted text content of the component only, the unformatted text content of the component only, only the picture, only the resizing or moving of the window, or a combination of two or more of these characteristics.

A time stamp may be associated 112 with the characteristic. It may be useful, for example, when multiple users are collaborating on (e.g., making changes to) a GUI, to record the exact time at which each change or each characteristic of a change occurs. This may be useful to facilitate sequential playback of changes (or one or more characteristics of the changes) at a later time. This may also be useful in determining priority in the case where two users attempt to change a single component at almost the same time. Use of a time stamp may permit a GUIS process to determine which user actually changed the component first, thereby allowing sequential implementation of the changes on the shared GUI. Alternatively, other means may be employed to prioritize certain changes over others when the changes are made by different users at almost the same time. For example, directory or other information may be interrogated to determine organizational hierarchy, thereby allowing changes made by supervisors, managers, or other high-ranking employees to supersede changes made by lower-ranking employees.

The determined characteristic of the change may be independent 114 of a user preference. In some embodiments, when sharing a GUI, it may be desirable to share only relevant content rather than the context of content (as may be embodied through user preferences). For example, it may be desirable to share text or image content without sharing the formatting of the text (e.g., font, character size, font color, etc.) or image (e.g., black and white, color, high resolution, flashing borders, adjusted transparency etc.). This may be useful in a variety of circumstances. For example, sharing only content, rather than the context of the content may permit more efficient use of limited computing power or bandwidth. Similarly, certain users may prefer context that would be unnecessary or distracting to other users. For example, a user preference may include using a particular color scheme, text size, or other viewing preferences—in other words, user preferences may relate to context or format rather than content. When the determined characteristic is independent 114 of a user preference, this may facilitate sharing only the aspects of changes that are relevant to content rather than particular presentation of the content.

As another example, visually impaired users may typically employ very large font size or high contrast color schematics, which may be unnecessary or even distracting for users without impaired vision. To continue the example of a visually impaired user, when such a user enters text, associated user preferences may result in display of the text in large, high-contrast font. GUIS process 12 may determine a characteristic of this change (i.e., input of text) to be simply input of the content of the text, rather than the particular large, high-contrast font, and thereby permit sharing of the text content only (but not the particular font) among users of the shared GUI.

It will be understood that the definition of a user preference may depend on the type of GUI-generating application that is being employed. For example, when an arrangement (e.g., location, size, ordering, etc.) of content windows is relevant to a presentation of concepts (e.g., when users are collaboratively arranging representations of ideas in order to determine appropriate relationships between the ideas) the size and location of a content window, or aspects of a font size or color or image border, may be considered to be content, rather than a user preference. In contrast, when users are viewing a GUI of a program such as an email interface (e.g., Lotus Notes®), in certain circumstances the size and location of various windows of the GUI may be irrelevant—only the content contained within the windows may matter. In this case, the size and location of the content windows may be considered a user preference, and, accordingly, the determined characteristic may be independent of window location and size. A GUIS process may determine what aspects of a GUI are user preferences automatically, for example through reference to past behavior, the type of GUI, the purpose of the collaborative sharing or other factors, or may permit users or moderators to indicate which aspects of the GUI relate to user preferences.

GUIS process 12 also may associate 118 the first characteristic with a second node of the tree structure. In one embodiment, the second node may be the same as the first node. For example, if a changed component includes only content, the node representing that component may relate only to content. Accordingly a characteristic of the change to the component may be associated 118 with the same node as the component itself. As another example, if a changed component is represented in the topic tree by a node with no associated sub-node, a characteristic of the change may be associated 118 with the same node as the component. In a different embodiment, the changed component may include content as well as other information (such as size, location, text color or font, etc.) that may be associated with, for example, a user preference. In this case, the component may be represented as a first node, with the content contained within the component represented as a first sub-node of the component node and the other information (e.g., user-preference information) represented as a second sub-node of the component node. As such, the characteristic of the change to the component (including, for example, changes to content such as text or images) may be associated with a different node than the component node (i.e., may be a sub-node of the component node).

Associating 118 the characteristic with a second node may facilitate sharing of changes to a GUI by permitting sharing of only important (e.g., content-related) information, rather than unimportant (e.g., context-related or user preference) information. Referring to the preceding discussion, for example, when the characteristic of the change is associated with a sub-node of the node representing the changed component, a GUIS process may operate more efficiently, because the amount of relevant information associated with the change (and thus the amount of information that may need to be shared among users or systems) may be decreased. For example, if the second node is a sub-node of the first node, transmitting the characteristic of the change may require transmitting only information associated to the sub-node, rather than additional information relating to the first node. In this way, it may be possible to communicate the essential elements a change to a GUI by transmitting less information (and thereby employing less computing power or bandwidth).

GUIS process 12 may transmit 122 the first associated characteristic to a second computing device. The associated characteristic may be transmitted using any means of electronic communication, and transmitting the characteristic may include the use of network 22, network 26 or another network or networks (not shown) as well as server computer 20 or another server or servers (not shown).

Transmitting 122 the associated characteristic may allow 124 the second computing device (or another computing device, if the second computing device is acting as an intermediary such as a message broker) to represent the first characteristic of the change based upon, at least in part, the topic tree structure. For example, the associated characteristic may include the addition of text to a content window in a mail application GUI on a first user's computing device. As such, this characteristic may be associated with a node that is in turn associated with the content of the content window, and which may also be a sub-node of another aspect or component of a shared GUI (and/or generally corresponding GUI, which may be contemplated by the term "shared GUI"). (As noted previously, it will be understood that a "shared" GUI may refer to a single GUI that is viewed across multiple systems or may refer to multiple GUIs across multiple systems, which may exhibit similar or otherwise corresponding components.) A computing device receiving the transmitted 122 associated characteristic (whether directly or indirectly, e.g., via a message broker) may, for example, use a shared topic tree structure associated with the shared GUI to determine that the characteristic of the change may be implemented by displaying the added text in the corresponding content window of the shared GUI on the display device of the recipient computing device (or another computing device). Through reference to the shared topic tree and the associated characteristic it may be determined that it is unnecessary to update the display of components (or sub-components) other than the component (or sub-component) directly affected by the characteristic of the change. This may be possible because the characteristic is associated 118 with a particular node (or sub-node) of the shared topic tree structure, which corresponds to a particular component (or sub-component) of the shared GUI. For example, a computing device may determine that only the text content of the changed window in the email application GUI (see above) need be updated, whereas the remainder of the GUI may remain unchanged.

Transmitting 122 the first associated characteristic may be done in real-time or near real-time, thus permitting users to view changes to the GUI as they occur. This may be useful, for example, in a collaborative eMeeting or an eLearning environment, in which participants may desire to view changes to the shared GUI without delay. Thus, real-time or near real-time transmission 122 of the characteristic may permit seamless interaction in the context of a shared GUI. Transmitting 122 the first associated characteristic may also occur some time after the change (from which the characteristic is determined 108) is made. This may be useful, for example, if a collaborator has to excuse herself from a meeting temporarily and, upon returning, desires to see a change (or changes) to the GUI that occurred during her absence. A delay in transmitting 122 the associated characteristic may also be necessary or desirable, for example, due to limitations in computing power or bandwidth.

Transmitting 122 the associated characteristic may include transmitting 122 the associated characteristic as a topic string 104 that may be associated with a message broker. A message broker may refer to an intermediary program that facilitates the transmission of electronic data (or "messages") between computing devices and systems. A message broker may facilitate transmission of messages by translating the language of one computing system to another, thereby minimizing the need for direct communication between computer application. A message broker may reside on client or server computing device and may be integrated into a GUIS process to varying degrees or may operate separately from the GUIS process. A message broker may receive or transmit information in the form of topic strings, which may correspond to components or sub-components of the total information received or transmitted by the message broker. In the case of a GUIS process, the topic strings in a message broker may represent components or sub-components of a GUI and, therefore, be associated with nodes or sub-nodes of a topic tree structure associated with the GUI.

To employ a message broker, users or computing devices may subscribe to a particular message feed, for example, by transmitting a unique key or code to the message broker. Subscribers may then "listen" to the message broker in order to receive updates to any topic to which they have subscribed. As noted above, in the case of a GUIS process, the topics may correspond to nodes or sub-nodes of a topic tree structure associated with a shared GUI. Accordingly, by subscribing to one or more topics through a message broker, users or computing devices may receive information relating to characteristics of changes associated with the particular components or sub-components of the shared GUI. Receiving updates of these topics may therefore permit a computing device to represent characteristics of one or more change to the shared GUI, based upon the shared topic tree structure.

It will be understood that users (via computing devices) may also act as publishers with respect to a message broker. A publisher may transmit information associated with a particular topic string or strings to the message broker, which information may then be distributed to subscribers. For example, in the context of a GUIS process, a publisher (e.g., which may include the GUIS process) may transmit to a message broker a characteristic (of a change) associated with a node in a shared topic tree structure, which may be associated with a particular topic string in the message broker. This characteristic may then be published by the message broker to a subscriber to that topic string, thereby facilitating representation of the characteristic of the change by the subscriber, based upon the association between that topic string and a node representing a component (or sub-component) of a shared GUI. It will be understood that a subscriber may also be a publisher (for any or selected changes) or may simply "listen."

In other words, when a message broker is used, each node of the tree structure may be represented by a topic string 104 in the message broker. In this way, the associated characteristic may be associated with a topic string 104 in a message broker that is also associated with the node of the topic tree structure that has been associated 118 with a characteristic of a change to a GUI. This may facilitate efficient distribution and display of relevant characteristics of changes to a shared GUI. It will be understood that associating a topic string 104 with a node in a shared topic tree structure, which is in turn associated with a shared GUI, may also be useful when transmitting 148 a sequence of characteristics.

In certain embodiments, as also described above, a delay in transmission 122 of a characteristic may occur. As one example, when a GUIS process transmits 122 the associated characteristic to a message broker (or transmits 122 the associated characteristic as a topic string 104 associated with a message broker), the characteristic may be transmitted 122 immediately upon or shortly after the characteristic being determined 108 and associated 118 with a node of the topic tree structure. The characteristic (as a topic string 104, in some embodiments) may be stored on or by the message broker (or another application or storage device) in order for later transmission 122 to a computer device in order to allow 124 that computing device to represent the characteristic. In another embodiment, in which a GUIS process includes a message broker, the characteristic may be stored on or by the message broker as, for example, an associated topic string 104 (e.g., stored individually or stored 142 as part of a set of characteristics). Continuing this example, at a later time, (e.g., when a temporarily absent user returns to an eMeeting) the characteristic (as, for example, an associated topic string 104) may then be transmitted 122 to a computing device (e.g., a computing device associated with the temporarily absent user), thereby allowing 124 that computing device to represent the characteristic.

As more fully described throughout this disclosure, input associated with a change to a component may be received 100, wherein a component or a portion of the component is represented 102 by a first node of topic tree. A characteristic of the change may be determined 108 and associated 118 with a node (same or a second node, which may be a sub-node of the first node). If the characteristic is transmitted 122 as a topic string 104 associated with a message broker, the topic string may be associated with the same second node. In this way, the characteristic may be transmitted by the message broker (directly or indirectly) to subscribers to the message broker as an update to the relevant topic string. (Note that a user may subscribe to a variety of topic strings in a message broker, each string being associated with one or more nodes of the topic tree representing the GUI.) Through GUIS process 12, a characteristic of a change to a component of the GUI may be associated 118 with a particular node of the relevant topic tree, then transmitted as an update to the topic string associated with node. Accordingly, a subscription to the message broker may receive information associated with the characteristic of the change and the user's GUI may be updated accordingly, to reflect the change (or the relevant characteristics thereof).

GUIS process 12 may store 142 a set of characteristics including the first characteristic. In some embodiments, multiple changes to a GUI may occur over the course of an eMeeting or other event in which a GUI is shared. It may be useful to determine 108 and store 142 a set of characteristics associated with these changes in order to permit later retrieval or review of the changes. One or more of the characteristics included in the set may then be transmitted 148 in predetermined order. Storing 142 may occur in a variety of locations, using a variety of devices, including a message broker, a GUIS process or computing device on which the process resides, or a separate storage device or process (not shown).

With respect to storing 142 a set of characteristics and transmitting 158 characteristics included in the set, the same principles discussed above may be applied, so that only characteristics relevant to content (as opposed to context or user preferences) may be stored and/or transmitted. Also, it will be understood that it may be desirable to store only a pre-determined number 144 of characteristics. This may, for example, permit the use of limited memory to store the characteristics or facilitate more rapid review of the changes by storing only the most recent or most important changes.

Transmitting 148 one or more characteristics included in the stored set of characteristics may be done in real-time or near real-time, thus permitting the recipient user (or computing system) to view (or display) changes to the GUI at the rate in which they have occurred. This may be useful, for example, in a collaborative eMeeting or an eLearning environment. Display of changes to the GUI may also occur some time after the changes are made. This may be useful, for example, if a collaborator has to excuse herself from a meeting temporarily and, upon returning, desires to see the changes to the GUI that occurred during all or a part of her absence. In such a case, characteristics of the changes may be displayed to the returning user in a sequence that includes all or some of the changes. The characteristics may also be displayed over an amount of time equivalent to the time over which the changes occurred (as may be useful in order for the returning user to follow the detail of the changes closely) or may be displayed over a shorter—or longer—amount of time (as may be useful in order to display to the returning user an accelerated—or decelerated—rendering of the changes).

GUIS process 12 may determine 128 a second characteristic of the change and associate 132 the second characteristic with a third node of the tree structure representing the GUI. The third node may be a sub-node 134 of the first or second node, may be the same node as the first or second node or may be entirely distinct from the first or second node. For example, a change to a GUI may include multiple related aspects such as relocation and resizing of a content window as well as addition of content to the window. In a context in which location and size of the content window may be relevant (i.e., independent 114 of user preferences), the first characteristic of the change may include the re-location and re-sizing of the window and the second characteristic of the change may include the addition of content (e.g., text content or image content) to the window. Because the added content may be part of the re-located and re-sized window in the GUI, the added content may be associated with a sub-node of the node representing the window itself or node representing the location or size of the window.

This relationship between nodes and sub-nodes associated with characteristics of changes to a GUI may facilitate efficient communication of the changes to the GUI. For example, where each characteristic of a change or changes is determined to be relevant, all of the characteristics may be transmitted 122. Likewise, if the characteristic associated with a certain node is determined to be relevant and should be transmitted 122, it may be determined that characteristics associated with sub-nodes of that node are also likely to be relevant and should therefore be transmitted 138. Alternatively, if it is determined that the characteristic associated with sub-node is important but other characteristics associated with other nodes or sub-nodes are not relevant, only the important characteristics (associated with the sub-node) may be transmitted 138. As noted above, transmitting a characteristic may allow 124 a computing device to represent the characteristic of the change to the GUI and thereby update a shared GUI to reflect relevant changes.

Figure 3:
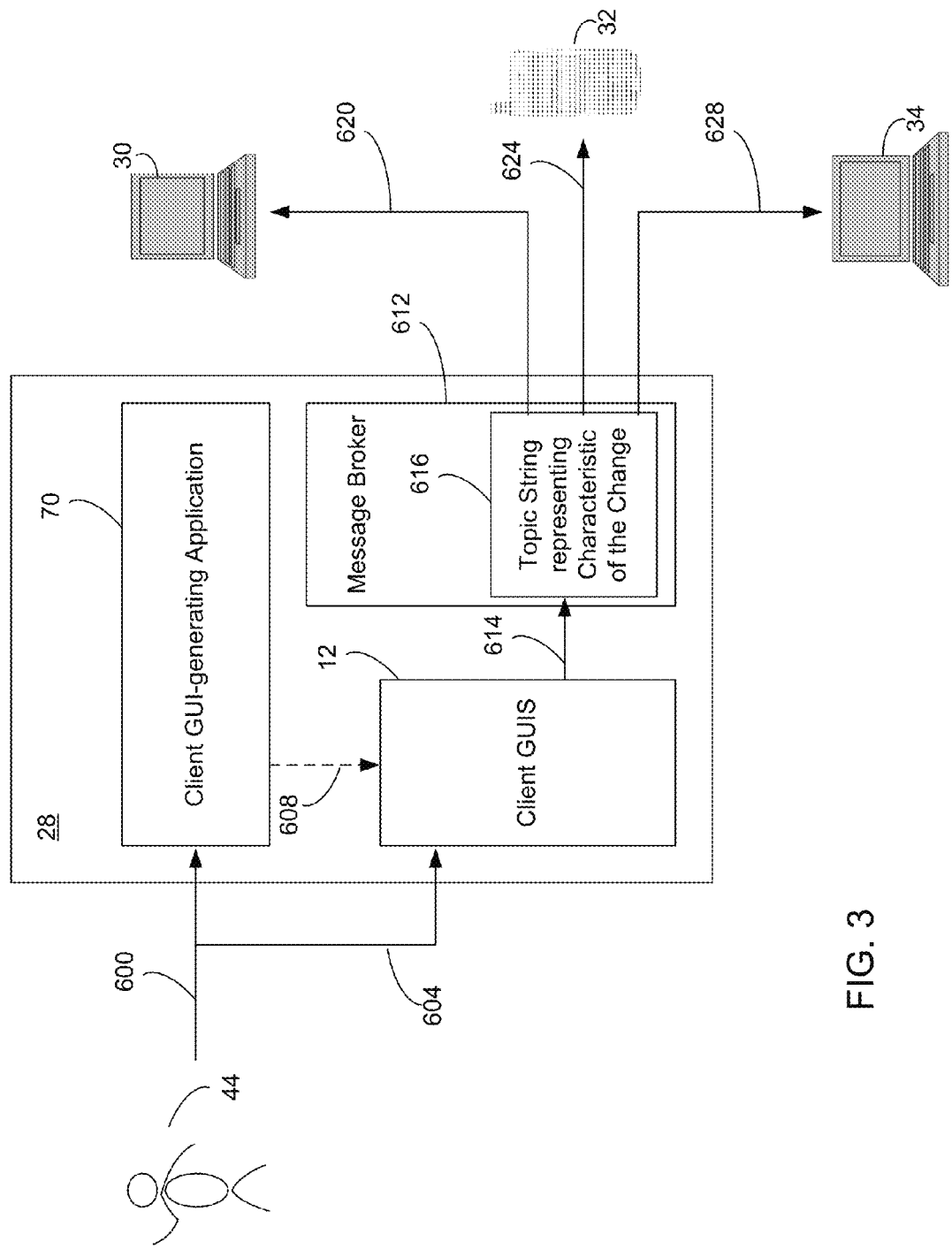
FIG. 3 is a diagrammatic view of an aspect of an implementation of the graphical-user-interface sharing process of FIG. 1.

Referring now also to FIG. 3, an exemplary embodiment of client GUIS process 12 employing a topic string 104 associated with a message broker is represented. In this embodiment, user 44 provides an input to computing device 28 associated with a change to a component of a shared GUI (not shown), which may be associated with client GUI-generating application 70. (It will be understood that the input may also be provided directly to client GUIS process 12 via communication channel 604 or may be provided to client GUIS process 12 via client GUI-generating application 70, via communication link 608.) Client GUIS process 12 may receive 100 the input associated with the change and may determine 108 a first characteristic of the change. Client GUIS process 12 may associate 118 the characteristic with a node of a topic tree structure (not shown). In this embodiment, client GUIS process 12 may transmit 122 the characteristic via communication channel 614 to message broker 612 as topic string 616 associated with message broker 612. The message broker may publish topic string 616 to subscribers to the message broker via communication channel 620, communication channel 624 and communication channel 628. By referencing a shared topic tree structure associated with the shared GUI (i.e., the GUI associated with client GUI-generating application 70 or a related GUI-generating application) the change to the shared GUI may be represented on computing device 30, computing device 32 and computing device 34 respectively.

In certain embodiments, users associated with computing device 30, computing device 32 and computing device 34 (i.e., user 46, user 48 and user 50, respectively) may also provide input to cause changes to the shared GUI, characteristics of which may be determined 108, associated 118 with nodes of the shared topic tree structure, and transmitted 122 (including transmission as a topic string 104 associated with message broker 612) in order to allow 124 representation of the changes on other computing devices.

Figure 4:
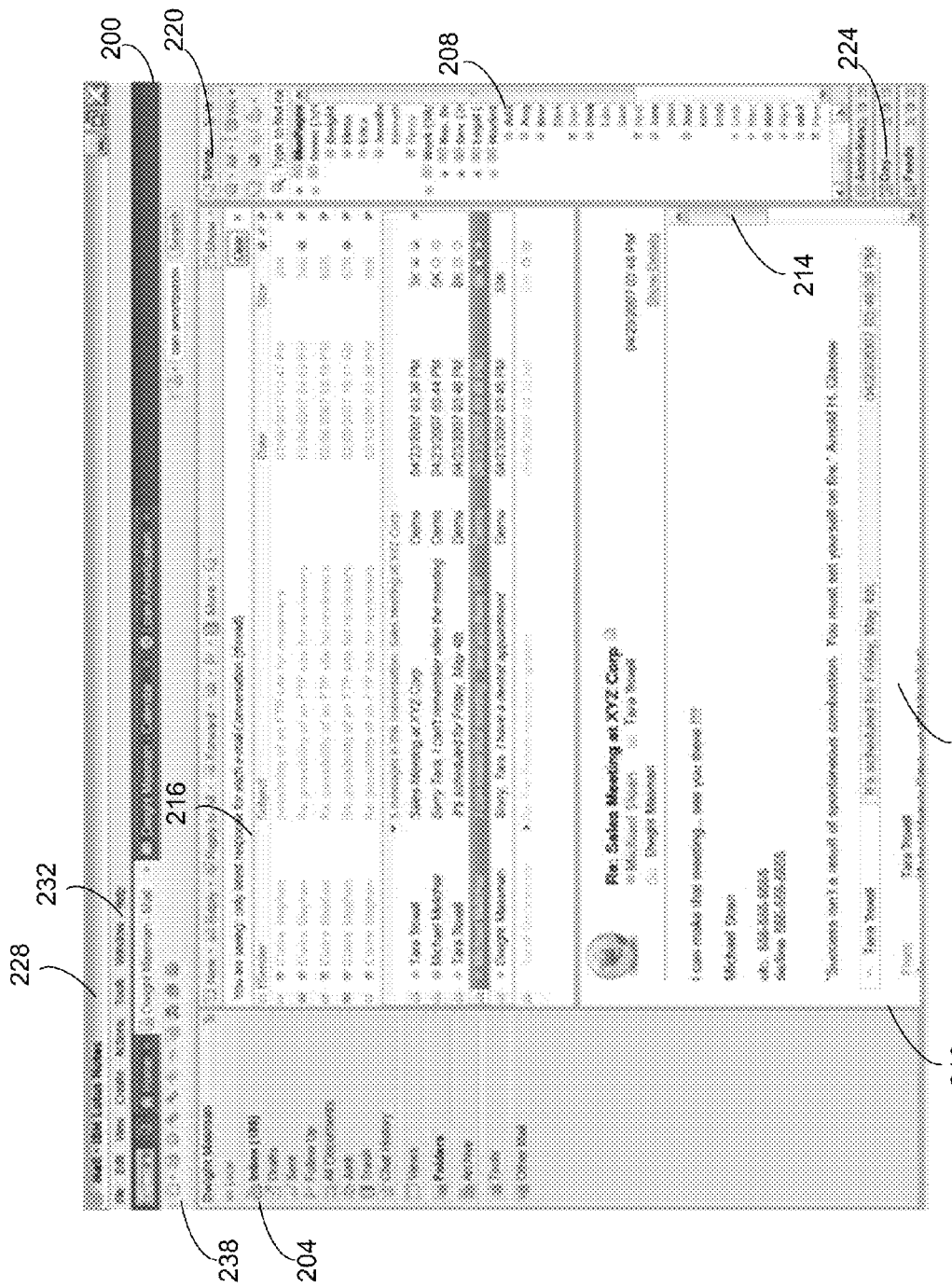
FIG. 4 is a diagrammatic view of a first graphical user interface.
Figure 5:
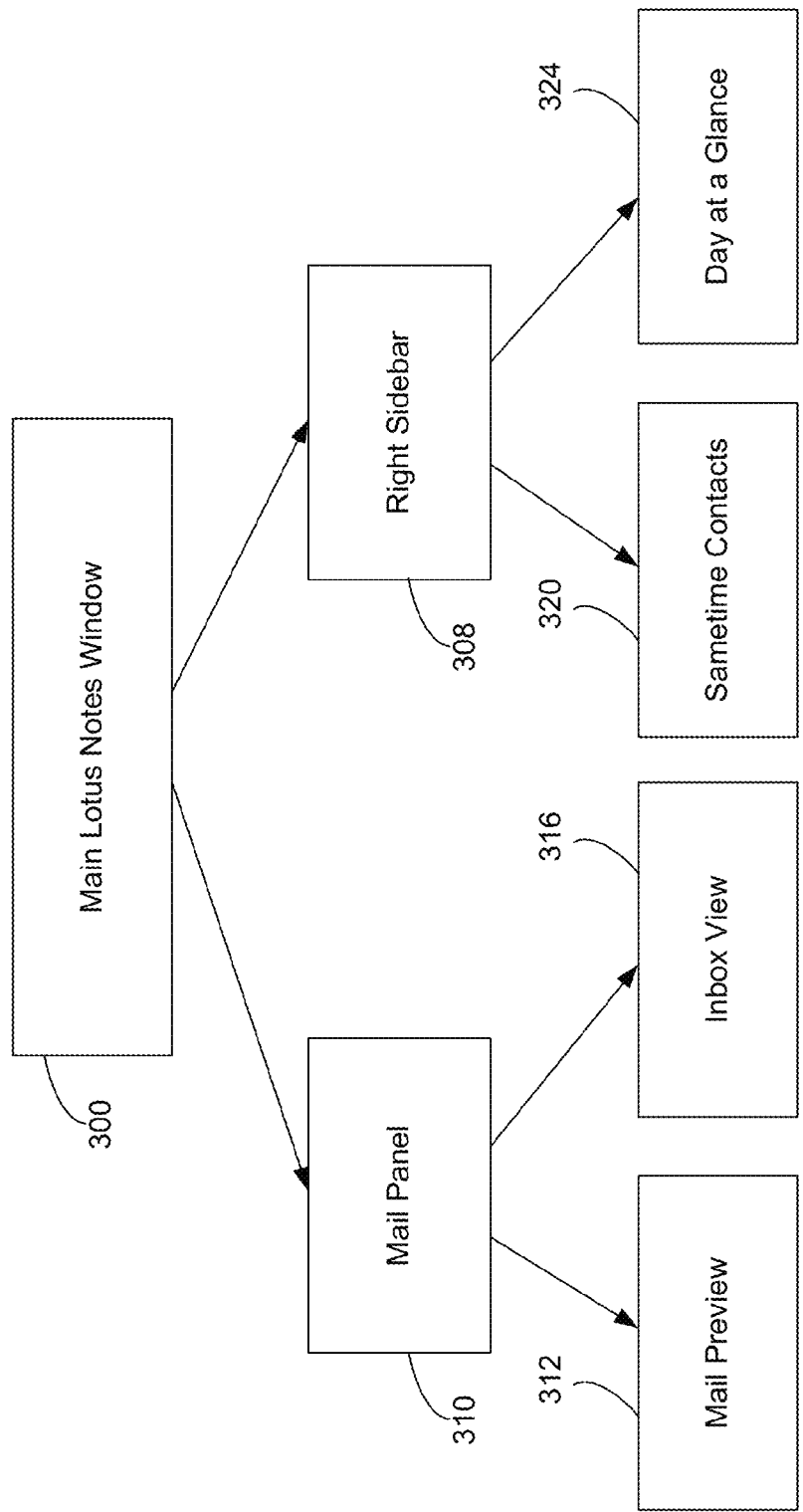
FIG. 5 is a diagrammatic view of a first topic tree associated with the first graphical user interface.

Referring now also to FIGS. 4 and 5, a first example of a representation of a GUI in a tree structure is depicted. For example, in the screenshot of a Lotus Notes® window represented by FIG. 4, the GUI 200 of the program includes various components, including header bar 228, menu bar 232, toolbar 238, left sidebar 204, mail panel 210 and right sidebar 208. Certain components also include sub-components, including, for example, mail preview 212 and inbox view 216, which are sub-components of mail panel 210, as well as Sametime® contacts 220 and Day at a Glance 224, which are sub-components of right sidebar 208. (Sametime is a trademark of International Business Machines Corporation in the United States, other countries or both.) It will be understood as well, for example, that left sidebar 204, toolbar 238, menu bar 232, right sidebar 208 and so on may be considered sub-components of GUI 200.

In one (partial) representation of GUI 200, the entire GUI 200 may be represented as root node 300 in a topic tree structure. Similarly, mail panel 210, mail preview 212 and inbox view 216 may be represented as sub-node 310, sub-node 312, and sub-node 316, respectively. As will be apparent from the disclosure, this topic tree structure representing GUI 200 may be useful in sharing GUI 200. For example, a user may share GUI 200 with a support technician, who directs the user to scroll the view in mail preview 212 using scrollbar 214. This action, when undertaken by the user may result in a change in the view of mail preview 212. In this example, however, other components of GUI 200 may remain static. Accordingly, it may be inefficient to transmit information associated with each component of GUI 200 in order to allow the support technician to view the change effected by the user.

GUIS process 12 may facilitate efficient transmission of this change by receiving 100 an input associated with the change (i.e., the use of scrollbar 214), wherein the change (i.e., the change in view) may be associated with a component (i.e., mail preview 212) which may itself be represented 102 as node 312. GUIS process 12 may then determine 108 a characteristic of the change—i.e., a changing view of mail preview 212. This characteristic may then be associated 118 with a node of the tree structure, in this case node 312. (It will be understood that a different change—e.g., entering content into a compose message window (not shown) may be associated with a different node than the node representing the changed component, for example, a sub-node of the node representing the changed component (not shown).) GUIS process 12 may then transmit 122 the characteristic as a topic string 104 associated with a message broker, thereby allowing 124 the computing device of the support technician to represent the change on the technician's screen, based upon a shared topic tree associated with GUI 200 (i.e., the topic tree of FIG. 4). In this case, topic strings of the message broker may include strings including:

LotusNotes/MailPanel/MailPreview
    LotusNotes/MailPanel/InboxView
    LotusNotes/RightSidbar/SametimeContacts
    LotusNotes/RightSidbar/DayAtAGlance.

According to this example process, as described above, representing this change to the technician may not require transmission of information associated with unchanged components, such as header bar 228, toolbar 238, left sidebar 204, etc. Also, in certain instances, GUIS process 12 may similarly not transmit 122 characteristics associated with non-content changes or characteristics (e.g., changes or characteristics associated with one or more user preferences). For example, if the technician instructs the user to compose a test message (not shown), the technician may not need to receive information relating to font size, font color, message window size, etc. Instead, the technician may receive, via GUIS process 12, only information relating to the text content itself and may apply his own user preferences regarding font size, font color, message window size, etc. to that text content.

Figure 6:
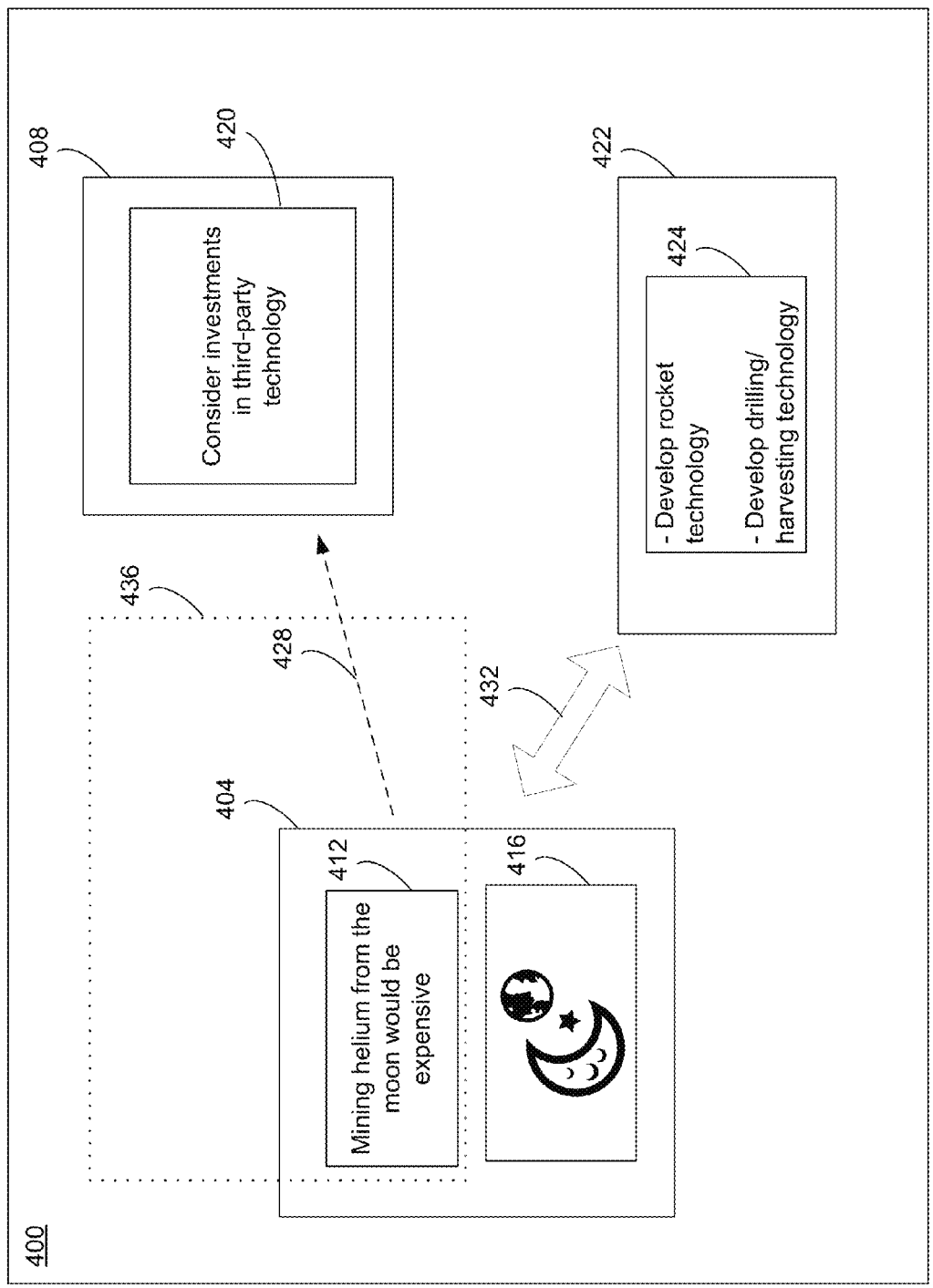
FIG. 6 is a diagrammatic view of a second graphical user interface.
Figure 7:
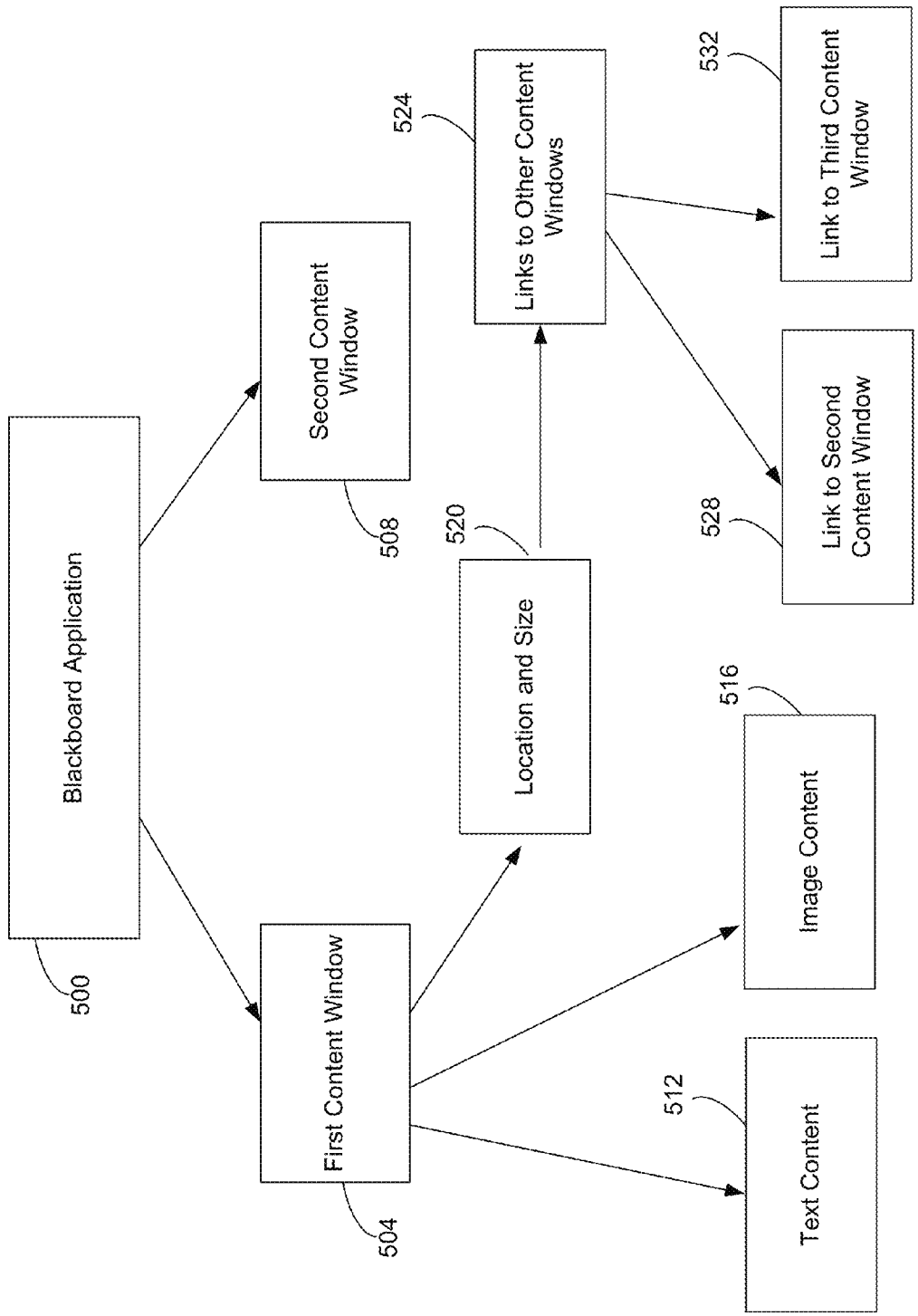
FIG. 7 is a diagrammatic view of a second topic tree associated with the second graphical user interface.

Referring now also to FIGS. 6 and 7, a second example of a representation of a GUI in a tree structure is depicted. In FIG. 6, GUI 400 represents a collaborative "blackboard" through which multiple users may interactively collaborate in a brainstorming eMeeting. Using the blackboard, users may insert content windows, such as content window 404, content window 408 and content window 422. Users may also insert content into, delete content from, or modify content in a content window. For example, one or more users have inserted text content 412 and image content 416 into content window 404. Users may also create active links or connections between and among content. For example, two-headed arrow link 432 may indicate that the content of content window 404 requires implementation of the content of content window 422 and vise versa. As another example, dotted arrow link 428 may indicate that the content of content window 404 suggests a possible course of action indicated by the content of content window 408.

GUI 400 may be represented by a topic tree structure, which is partially depicted in FIG. 7. For example, GUI 400 corresponds to root node 500 and content window 404 corresponds to sub-node 504. Because users can modify content windows in various relevant ways, including adding, deleting or modifying content, moving and resizing the content windows, or providing links to other content windows, sub-node 504 may also be represented as having various sub-nodes. For example, sub-node 512 may correspond to text content of content window 404, sub-node 516 to image content, and sub-node 520 to location and size. Because a link to another window may be dependent on the location and size of particular window, sub-node 524 may represent links to other content windows, with sub-node 528, for example, representing link 428 between content window 404 (i.e., node 504) and content window 408 (i.e., node 508). Various nodes and sub-nodes corresponding to the components and sub-components of GUI 400 may not be shown in the partial topic tree representation of FIG. 7.

GUIS process 12 may facilitate sharing of GUI 400 in order to allow collaborate brainstorming using the blackboard program. For example, a user may determine that content window 404 should be moved, in order to facilitate placement of new topic window 436, and resized in order to permit inclusion of additional text content. GUIS process 12 may receive 100 input associated with this change (or changes) and determine 108 characteristics of the change (or changes). Because, in this situation, size and location of content window 404 may be viewed as important content of GUI 400, rather than context or user preference (due to the graphical nature of the brainstorming representation), GUIS process 12 may determine 108 one or more characteristics of the change (or changes) as the translation and expansion of content window 404. This characteristic(s) may be associated 118, for example, with node 520 of the topic tree depicted in FIG. 7, and may be transmitted 122 in order to allow 124 other participants to view the changes to shared GUI 400.

As can be seen in FIG. 7, the characteristic of the change to content window 404 (associated with node 520) may implicate various sub-nodes, including sub-node 524, sub-node 528 and sub-node 532. (This corresponds in GUI 400 to the need to adjust link 432 and link 428 in order to preserve the links between relocated and resized content window 404 and both content window 408 and content window 422.) Accordingly, GUIS process 12 may further determine 128 a second characteristic (or characteristic) of the change corresponding to the need to adjust the links between content windows. This second characteristic may be associated, for example, with sub-node 524, sub-node 528 or sub-node 532, and transmitted as a topic string 104 associated with a message broker. In this way, other users may view the changes to the GUI without the need to transmit information unrelated to the change (e.g., information associated with node 508, sub-node 512, or sub-node 516).

In some embodiments, a moderator (sometimes referred to as an administrator) may control aspects of a GUIS process. As one example, if changes to a GUI are implemented simultaneously, or near-simultaneously, or changes to a GUI otherwise conflict (e.g., one participant moves a content window to a first location whereas a moderator moves the same content window to a second location; or one participant deletes content from a GUI whereas that content has been recently added by a moderator), the changes implemented by a moderator (or one or more characteristics of those changes) may override the changes implemented by a non-moderator (or lower-ranking moderator). Continuing the parenthetical example above, for example, the moving of the content window by the participant may not be implemented or may be quickly undone based on the conflicting move of the content window by a moderator. Similarly, the content added by a moderator may be "locked" or otherwise protected so that it may not be deleted by a non-moderator participant (or may not be deleted without the moderator's permission).

A moderator also may control aspects of a GUIS process in other ways. For example, in one embodiment a moderator may grant (or deny) permission to publish one or more characteristics or a change (e.g., as topic strings 104) to a message broker and/or permission to subscribe to one or more topic strings 104 on a message broker. For example, a moderator may grant one or more users permission to see all of or only a portion of a particular shared GUI and/or all of or only a portion of a change or type of change to one or more components of a shared GUI. For example, if a document that contains sensitive information forms part of a shared GUI, a moderator may, using a GUIS process, permit certain (or all) users to receive information associated with only components (and/or characteristics of changes to those components) associated with non-sensitive information. For example, using a GUIS process, a spreadsheet GUI may be shared which contains both hours-worked information (non-sensitive) and payscale or bonus information (sensitive). Using the GUIS process, a moderator may for example prevent all participants (or a portion of the participants) from viewing, and/or receiving characteristics of changes associated with, components of the GUI associated with the sensitive information (i.e., the payscale or bonus information).

In one embodiment, a moderator may control access to a portion of a shared GUI (and/or characteristics of changes to that portion) through the use of two effective topic trees. A first "open" tree may, for example, include nodes associated with all components of the shared GUI, including components containing sensitive content. A second "approved" tree may, for example, include only nodes associated with components of the shared GUI that have been approved by the moderator for viewing by a subset of participants. In this way, a moderator may approve only certain of the changes represented through nodes of the open tree for representation as nodes of the approved tree, thereby controlling which changes (or characteristics of changes) may be represented in the approved tree, and, accordingly, which changes (or characteristics of changes) may be viewed by participants viewing the shared GUI.

In another embodiment, a GUIS process may permit a moderator to control access to a portion of a shared GUI (and/or changes to that portion) through the use of two or more message brokers. In this embodiment, for example, certain characteristics of changes to (or views of) a component of a GUI may be published to a first message broker. Based on moderator approval (or denial) those characteristics (or views) may then be published (or not published) to a second message broker. If a subset of participants are permitted (e.g., by the moderator) to subscribe only to updates through the second message broker, that subset of participants will thereby receive (through subscription to the second message broker) only characteristics (or views) that have been approved by the moderator.

A GUIS process may allow a moderator to approve (or deny) access to characteristics of changes to a component of a GUI (or views of a component of a GUI) based upon a variety of criteria. For example, approval (or denial) may be based upon pre-set preferences or rules, upon the type of GUI or GUI-generating application, upon the identify of participants in a GUI-sharing session, upon the identity of the moderator, and/or upon analysis of past GUI-sharing (or other) sessions (e.g., through the use of data mining). Approval (or denial) may also be based upon, for example, an input from a moderator. For example, a moderator may designate components and/or types of characteristics of changes that may (or may not) be viewed by a subset of participants before or during a GUI-sharing session, or may indicate approval (or denial) of the sharing of a particular characteristic (or view) with a particular sub-set of participants in response to a prompt associated with the particular characteristic (or view). For example, if a participant enters sensitive content into a particular component of a shared GUI (or enters any type of content into a sensitive component), a prompt may indicate this addition to a moderator, permitting the moderator to indicate that the moderator does not approve sharing of one or more characteristics (or views) of the addition with a particular sub-set of the participants. While in the foregoing examples, priority for changes and/or to the GUI and/or control of the GUIS process may be given to a moderator, this intended for illustrative purposes only. According to various embodiments, priority for changes and/or modifications to the GUI may be based upon, at least in part, one or more preferences and/or setting, e.g., which may establish one or more rules of priority and/or hierarchy for implementing changes and/or modifications to the GUI.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
   receiving, by a first computing device, a first input associated with a change to a component of a graphical user interface, wherein a portion of the component is represented as a first node of a topic tree structure representing a portion of the graphical user interface;
   determining, by the first computing device, a first characteristic of the change;
   associating, by the first computing device, the first characteristic of the change with a second node of the topic tree structure; and
   in response to receiving the change, transmitting to a second computing device, by the first computing device, the associated first characteristic, wherein transmission of the associated first characteristic allows one or more of the second computing device and a third computing device to represent the first characteristic of the change based upon, at least in part, the topic tree structure, wherein the transmission to one or more of the second computing device and the third computing device of the associated first characteristic of the change lacks context of the change to the component that is present at the first computing device.

2. The computer-implemented method of claim 1 further comprising:
   determining, by the first computing device, a second characteristic of the change;
   associating, by the first computing device, the second characteristic of the change with a third node of the topic tree structure, wherein the third node is a sub-node of one or more of the first and second nodes; and
   transmitting to the second computing device, by the first computing device, the associated second characteristic, wherein transmission of the associated second characteristic allows one or more of the second computing device and the third computing device to represent the second characteristic of the change based upon, at least in part, the topic tree structure.

3. The computer-implemented method of claim 1 wherein transmitting the associated first characteristic includes transmitting the associated first characteristic as a topic string associated with a message broker, wherein the message broker is configured to receive published information and transmit a portion of the published information to a subscriber, and the topic string is associated with the second node of the topic tree structure.

4. The computer-implemented method of claim 1 wherein the first characteristic is associated with a text content of the component.

5. The computer-implemented method of claim 1 wherein a time-stamp is associated with the first characteristic.

6. The computer-implemented method of claim 1 wherein the first characteristic is independent of a user preference.

7. The computer-implemented method of claim 1 further comprising:
   storing, by the first computing device, a set of characteristics including the first characteristic; and
   transmitting, in a pre-determined order, by the first computing device, one or more characteristics included in the set of characteristics.

8. The computer-implemented method of claim 7 wherein the set of characteristics includes a pre-determined number of characteristics.

* * * * *